United States Patent [19]

Smith

[11] 4,443,155
[45] Apr. 17, 1984

[54] WIND ROTOR THRUST-ACTUATED BRAKE

[76] Inventor: Donald R. Smith, 559 63rd St., Oakland, Calif. 94609

[21] Appl. No.: 193,953

[22] Filed: Oct. 6, 1980

[51] Int. Cl.$^3$ .............................................. F03D 7/02
[52] U.S. Cl. ....................................... 416/32; 416/14; 416/41; 416/133; 416/169 R
[58] Field of Search ...................... 416/133, 169 B, 32, 416/14, 149, 150, 152, 161, 41 A; 415/18, 34, 14, 140

[56] References Cited

U.S. PATENT DOCUMENTS

| 12,870 | 5/1855 | Peabody | 416/133 X |
|---|---|---|---|
| 14,143 | 1/1856 | Peabody | 416/133 |
| 30,848 | 12/1860 | Wentworth | 416/133 |
| 282,122 | 7/1883 | Schramm | 416/32 X |
| 381,313 | 4/1888 | Winchell | 416/32 X |
| 562,246 | 6/1896 | Rust et al. | 416/169 B |
| 641,793 | 1/1900 | Otis | 416/133 X |
| 999,188 | 7/1911 | Agre et al. | 416/150 |
| 1,334,485 | 3/1920 | Clipfell et al. | 416/169 B X |
| 2,484,197 | 10/1949 | Veldhuis | 416/41 A X |
| 2,629,450 | 2/1953 | Fumagalli | 416/150 X |
| 3,123,282 | 3/1964 | Pothier et al. | 415/18 |
| 3,209,993 | 10/1965 | Seifert | 416/169 A X |

FOREIGN PATENT DOCUMENTS

| 177164 | 10/1906 | Fed. Rep. of Germany | 416/14 |
|---|---|---|---|
| 455854 | 11/1928 | Fed. Rep. of Germany | 416/133 |
| 743890 | 1/1944 | Fed. Rep. of Germany | 416/32 |
| 345761 | 12/1904 | France | 416/14 |
| 915395 | 11/1946 | France | 416/133 |

Primary Examiner—Everette A. Powell, Jr.

[57] ABSTRACT

A new type of overspeed control system for a rotor driven by wind or some other fluid flow. The rotor support is mounted so that it can move back some small distance along the direction of the fluid flow, the rotor axis remaining in substantially the same direction during this movement. This backward movement is in response to the thrust generated by the lift and drag forces on the rotor impellers. At a predetermined thrust force, indicating that the rotor is operating in a fluid velocity high enough to cause overspeeding, the backward movement of the rotor engages a brake to slow the rotor. Essential to the invention is the use of the backward movement of the rotor to brake the rotor.

1 Claim, 3 Drawing Figures

WIND ROTOR THRUST-ACTUATED BRAKE

BACKGROUND OF THE INVENTION

1. Field of the Invention

This invention relates generally to a new design of overspeed control for fluid driven rotors, and especially to rotors driven by natural winds.

The importance of overspeed control to protect wind powered rotors in high winds is well known to those skilled in the art. The wind driven rotor and the machinery driven by it are usually designed to produce their maximum output in winds of from 10 to 15 meters per second (m/s) or 22 to 33 mph. Yet in storm conditions the system must be able to survive gusts of over 50 m/s (112 mph).

The potential power in the wind through the area swept by the wind rotor increases with the cube of the windspeed, and the aerodynamic and centrifugal forces on the blades, as well as the thrust on the tower top, increase with the square of the wind velocity. Thus in a storm wind five times the rated windspeed, the potential power output would be 125 times the rated power. In the same wind, if the rotor is allowed to operate at the optimum tip speed (the ratio of the speed of the rotor's blade tips to the windspeed), the bending and centrifugal forces on the blades, and the thrust on the tower top tending to push it over backwards, will be 25 times as great as the values at the rated condition.

It is usually not practical or economic to build a wind powered system to utilize or even withstand such high forces. Clearly the wind rotor itself, and often the device driven by it, cannot be allowed to continue to operate "normally" in very high winds.

2. Description of the Prior Art

Low speed multi-bladed windmills, such as are used for water pumping on farms, are usually constructed with the rotor offset from the tower center so that they turn to the side in high winds. Similar systems of overspeed control on high speed wind rotors (see, for example, U.S. Pat. No. 1,698,709, wherein the rotor turns to the side, and U.S. Pat. No. 2,245,264, wherein the rotor tilts up and back) have not been as successful. The aerodynamic and gyroscopic forces on the high speed rotor blades when the rotor is partially tilted are very high and vary from a maximum to a minimum value during each revolution. Problems with vibration result. In addition, it is difficult to use a downwind rotor in a system that uses tilt back to control overspeeding.

The most successful overspeed control systems on high speed wind rotors have used centrifugal feathering of the blades (see, for example, U.S. Pat. Nos. 2,248,218 and 2,464,234). However, these systems are usually expensive (up to 25% of the system cost) and complicated. Their complications can lead to failures, often with disastrous results.

The subject invention is a simpler, more reliable, and less expensive overspeed control system than heretofore known.

The subject invention relates generally to a new type of overspeed control for fluid driven turbines, and more particularly, but not by way of limitation, to the control of high speed horizontal axis wind driven turbines often called "propeller type" because of their resemblance to airplane propellers. These turbines, using impellers with airfoil profile cross sections, operate very efficiently at high tip speed ratios, that is, when their impeller tips are traveling at velocities higher than the velocity of the fluid driving them. In addition, these high speed turbines operate at speeds that require little or no step up gearing between them and driven devices such as generators, pumps, compressors, etc. This is important, as the cost of the gearing often exceeds the cost of the driven device itself in wind driven systems.

High speed rotors, however, produce little or no power at low tip speed ratios. Thus, once stopped, high speed rotors often have difficulty restarting the driven machinery. The prior art shows several inventions designed to alleviate this characteristic of high speed rotors. These include systems using a motor to start the rotor (see U.S. Pat. No. 2,086,279), clutches to allow the rotor to attain a high speed before engaging the load (see U.S. Pat. No. 3,891,347), and the provision of extra rotor blades for starting (see U.S. Pat. No. 2,215,456).

This poor performance of high speed rotors at low tip speed ratios also requires that designers of wind driven devices match the rotor loads to the rotor output so that in no operating wind condition is the rotor slowed below the tip speed ratio where the impellers "stall" aerodynamically and the power drops off precipitously. See, for example, *The Generation of Electricity by Wind Power,* by Edward Golding, John Wiley & Sons, New York 1978, pp. 235-6.

The subject invention utilizes this characteristic of high speed rotors, their poor performance at low tip speed ratios, to help control overspeeding. By application of the brake in high winds, the rotor is never allowed to operate at high tip speed ratios in high winds.

Devices are known that appear superficially similar in structure, incorporate brakes for overspeed control, or respond to wind thrust. However, it is readily seen that those devices operate in a significantly different manner from the subject invention.

Some prior art teaches the use of the thrust on the rotor to control overspeed, but not through the use of a brake. U.S. Pat. No. 2,533,785 to Charles Fumagalli shows a means of allowing the thrust on the rotor blades to bend them back into the wind, thus reducing the area swept and thus the power extracted by the rotor in high winds.

U.S. Pat. No. 4,008,006 to Karl J. Bea shows a means to use the thrust on the wind rotor to control the displacement of the pump driven by the rotor. This can match the pump power requirements to the wind rotor output and thus indirectly help to control overspeed, at least up to the windspeed at which the potential output of the wind rotor exceeds the maximum requirements of the pump. Bea envisioned the use of a brake in his system (see column 4 of his patent text) but clearly did not anticipate actuating it by the rotor thrust but by "known controls" (presumably anemometers) operating "known forms of shaft brake mechanisms".

The use of mechanical brakes actuated by wind flaps, flat plates held into the wind, for overspeed control has been known in the art. For example, see U.S. Pat. No. 1,408,905 to Pearson and U.S. Pat. No. 3,667,861 to Parish. These devices differ from the subject invention in that they do not use the rotor thrust, which is a much larger force, and a force more indicative of actual stresses in the blades, to actuate the brake.

SUMMARY OF THE INVENTION

The subject invention provides a new type of overspeed control for controlling a fluid driven rotor. The rotor support is mounted so that it can move back some small distance along the direction of the fluid flow, while the rotational axis of the rotor remains in substantially the same direction in relation to the direction of fluid flow. This backward movement comes in response to the thrust on the rotor created by the lift and drag forces on the rotor's impeller or impellers. This backward movement is opposed by some means, such as springs urging the rotor forward. At a predetermined thrust value, equal to the thrust generated when the fluid velocity has reached a magnitude where regulation is necessary to prevent overspeeding of the turbine, the backward movement of the spinning rotor actuates a brake to slow the rotor. The brake can be a friction brake of any of several known types. It may also be an electric or hydraulic retarder or any other rotary brake known in the art. Essential to the invention is the use of the backward movement of the rotor to brake the rotor.

A general object of the invention is to provide a simple, inexpensive, and reliable overspeed control for wind rotors and thus hasten and assist the use of a renewable energy source.

Another object is to provide an overspeed control system simpler to construct, maintain and repair than previously known systems.

A further object is to provide an overspeed control system for wind rotors that reduces the aerodynamic and gyroscopic forces on the rotor blades since the rotor is never operated at an angle to the wind direction.

Another object is to provide an overspeed control system for wind rotors that reduces the gyroscopic stresses on the tower supporting the wind rotor by bringing the rotor to a complete stop when the wind velocity is very high.

DESCRIPTION OF PREFERRED EMBODIMENTS

In order to make clear the method of operation of the preferred embodiments, it will be helpful to first consider the operating characteristics of a fluid driven turbine of a typical design.

Figure 1:
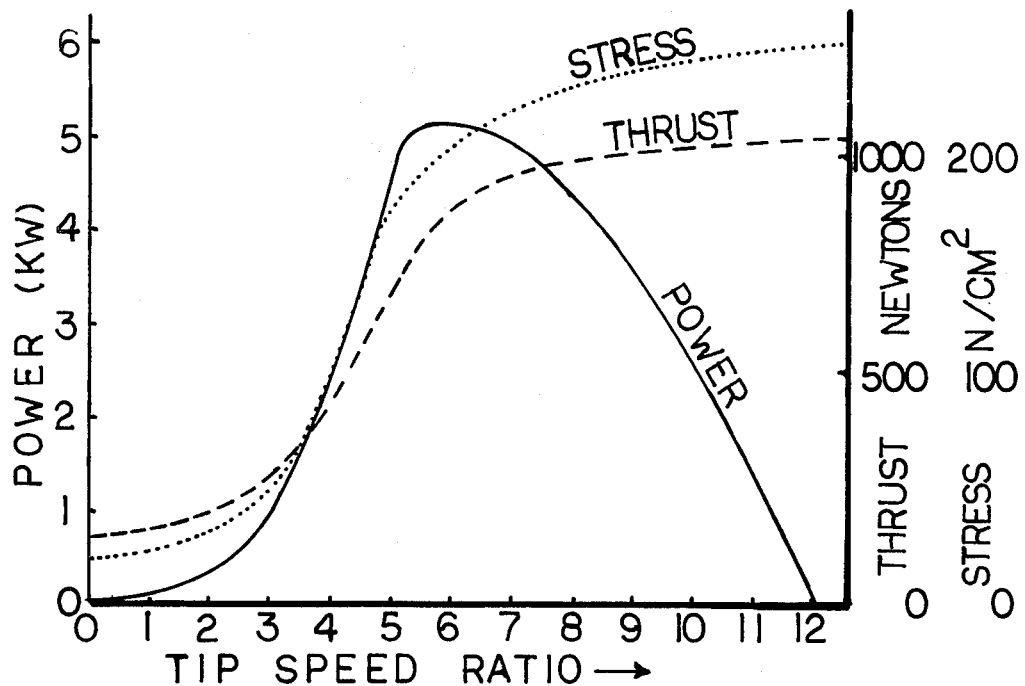
FIG. 1 is a plot of output, axial thrust, and blade bending stress vs. tip speed ratio for a typical high speed wind driven rotor in a 10 m/s (22.4 mph) wind.

Referring now to the drawings, FIG. 1 shows the output curve of a typical high speed propeller type wind rotor of 5 meters (16.4 ft.) in diameter operating in a wind of 10 m/s (22.4 mph) velocity. This data is from a computer program developed recently by the inventor and Bill Wong of Berkeley, Calif. Other theoretical studies and test results based on actual turbines give similar results.

It can be seen that the turbine of FIG. 1 would produce 5.2 kilowatts (kw) of mechanical output power (7 HP) in this 10 m/s wind if it was connected to a driven device that required this power at the appropriate rotational speed of 191 rpm. If the device driven by the wind rotor (be it a generator, pump, compressor, gearbox, or whatever) required exactly that input power at that speed, this rotor would operate at a tip speed ratio (hereafter: TSR) of 5 to 1 and produce its optimum output in this windspeed. If, however, the load seen by the rotor is less than 5.2 kw (which is the usual design practice in matching wind rotors to driven devices) the rotor will operate to the right of the power peak shown in FIG. 1 (i.e., at a TSR greater than 5) and thus produce slightly less than its optimum power. The exact TSR that it will operate at will depend on the input power requirement curve of the device run by the rotor.

If, however, the load requires more power than the rotor can produce in this windspeed at its optimum TSR the rotor will slow down and, depending on the power requirements of the load at lower rotational speeds, may even come to a complete stop in this wind condition. This characteristic of fluid driven rotors, considered a shortcoming in general, is utilized to assist in overspeed control by the subject invention.

Another characteristic of wind driven rotors is evident in FIG. 1. The axial thrust produced by the effective wind striking the blades, which is the force parallel to the wind direction tending to push the tower over backwards, is low but still significant even when the rotor is completely stopped (i.e., TSR=0). At higher tip speed ratios the thrust rises until it reaches a maximum at a TSR of about 7. The bending stress in the blades follows roughly the same curve, except that it continues to increase until a TSR of 12, which is the "free-wheeling" TSR for this rotor, that is, the TSR at which it will run when under no mechanical load. The close correlation between the thrust produced by the wind rotor and the bending stress in its blades shows that an overspeed control system based on thrust not only protects the tower top from high forces but also limits the bending stresses in the blades.

The preceding discussion has been based solely on conditions in one windspeed, 10 m/s (22.4 mph). Even in the free-wheeling condition the stress in the blades would be well below a safe limit for common blade materials such as Sitka Spruce. (See *Modern Timber Design*, Howard J. Hansen, John Wiley & Sons, 1948, p. 262). Studies of wind speed distributions show that typical locations experience a wind speed of 2.5 times the mean wind speed less than 0.2 percent of the time, or only 18 hours per year.

Second, once the brake is engaged, the wind rotor is made to operate below its optimum TSR, with its blades stalling. Thus the rotor is operating at a very low efficiency and the power to be dissipated by the brake is low.

Third, the wind rotor stops completely in very high winds. The loss in power produced by this is negligible, as "dangerous" winds (above 20 m/s [45 mph]) occur less than a few minutes per year in typical locations and it is best to have the rotor stopped completely at these times. As mentioned before, in windstorm conditions with the rotor still turning, as do centrifugally feathered rotors, the blades and tower are subjected to high gyroscopic forces when the rotor "yaws" into a wind rapidly changing directions.

Fourth, the gusty nature of wind aids in the cooling of the brake as it is unlikely that the brake would be engaged for a sustained period of time without the wind dropping either below the regulated speed or above the locked speed.

Fifth, the same high winds that cause the brake to be engaged can also be directed to cool the brake.

As described herein the subject invention is a sufficient overspeed control for wind rotors. However, for cases where extreme reliability is required, the subject invention could be combined with other known overspeed control systems as a primary or back-up system. direction) rapidly while rotating, as often occurs in windstorms.

Figure 2:
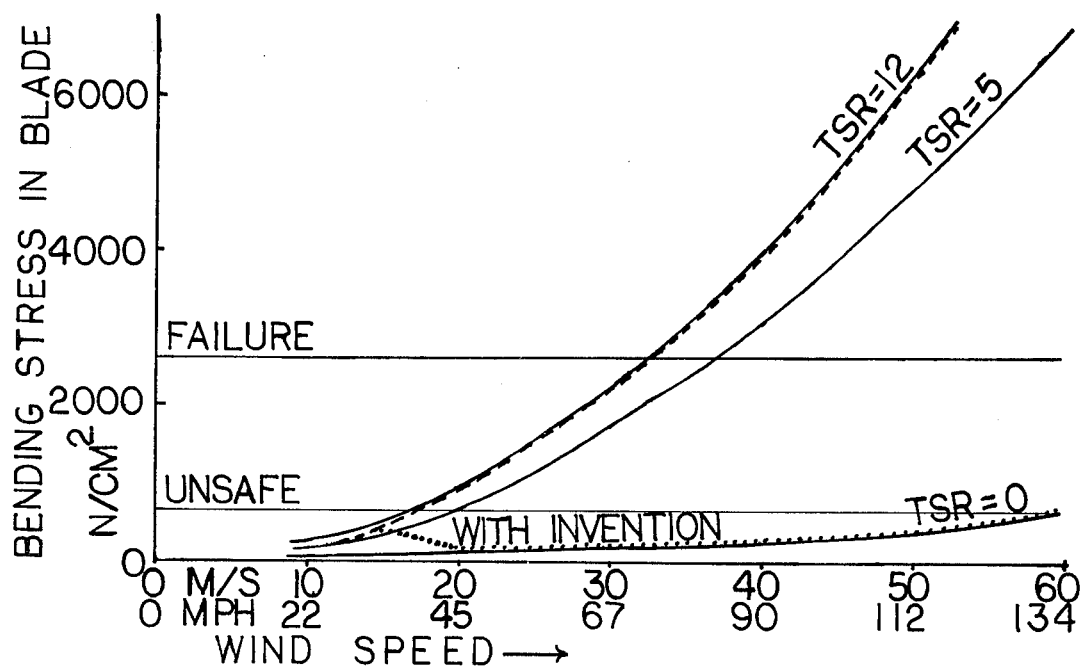
FIG. 2 is a plot of the maximum bending stress in the blades of the rotor of FIG. 1 vs. windspeed while the rotor is operating at different tip speed ratios and with and without the subject invention preventing overspeeding of the rotor.

The blade stresses in a rotor protected by the subject invention are represented by the dotted line in FIG. 2. When the thrust developed by the wind rotor exceeds a certain value, corresponding to that produced in winds of 15 m/s (34 mph) in the example, the brake is engaged. The wind rotor is thus subjected to a power requirement greater than it can produce, pulling it down to a lower TSR and "stalling" the rotor blades. The wind rotor's low efficiency at this TSR reduces the wear on the brake. At some higher wind speed, determined by the size and type of brake and its actuation means, the wind rotor is brought to a complete halt. This wind speed is shown as 20 m/s (45 mph) in FIG. 2. The rotor is held from turning at higher windspeeds by the thrust which is still enough to engage the brake even at the TSR of 0. This keeps the stress in the blades to safe levels, in this rotor design, up to windspeeds of 60 m/s (134 mph).

It might seem that rapid brake wear and overheating would be a problem in the invention. This is not the case for several reasons.

First, the brake isn't engaged a great deal of the time. The subject invention, like the generator or other device driven by the wind rotor, should be sized to the rotor based on the expected wind regime at the site. In general, the lowest cost per kilowatthour of energy extracted occurs when the driven device is approaching maximum output (at "rated speed") when the windspeed is about twice the annual mean value. Inotherwords, in a location with a mean wind speed of 5 m/s (11.2 mph), which is a location with a good, but not outstanding wind resource, the optimum system would have a rated windspeed of 10 m/s (22.4 mph). A practical "regulated" windspeed at which the brake is first engaged would be about 2.5 times the mean or 12.5 m/s (28 mph).

It should be noted that this discussion has ignored centrifugal stresses which are much lower in typical rigid blade designs than bending stresses. The subject invention, however, by controlling rotor speed also limits centrifugal forces which predominate in flexible and coned (blades bent back into the wind) rotor designs.

It is well known that aerodynamic forces increase with the square of the fluid velocity. At the same TSR, and thus with the effective wind hitting the impeller(s) at the same angle of attack, the lift and drag forces and thus the thrust and bending forces on the impeller(s) increase with the square of the wind speed. Referring again to the drawings, FIG. 2 shows the blade stresses in the previous rotor at higher wind velocities and at three different tip speed ratios.

The prior art shows that devices driven by wind rotors are typically sized to produce their maximum output in winds from 10 to 15 m/s (22 to 33 mph). Above that windspeed the power requirements of the driven device level off, or in some cases, actually decrease. At very high windspeeds a wind rotor without overspeed control will be driving a load that is then a small fraction of the potential output of the rotor as this potential output rises with the cube of the windspeed. So the rotor runs closer and closer to its freewheeling TSR. A wind rotor without overspeed control driving a typical load would create stresses in its blades that would move along the dashed line in FIG. 2. The blades, if made of Spruce, would be under an unsafe stress in a wind speed of 17 m/s (38 mph) and would certainly be destroyed in a wind of 32 m/s (72 mph). For the "Safe Limit" shown in FIG. 2 a factor of safety of 4 is taken in relation to absolute strength (2600 newtons per square centimeter) as the real stresses in the blades also include, among others, high gyroscopic forces when the rotor is "yawing" (changing to face the wind).

Figure 3:
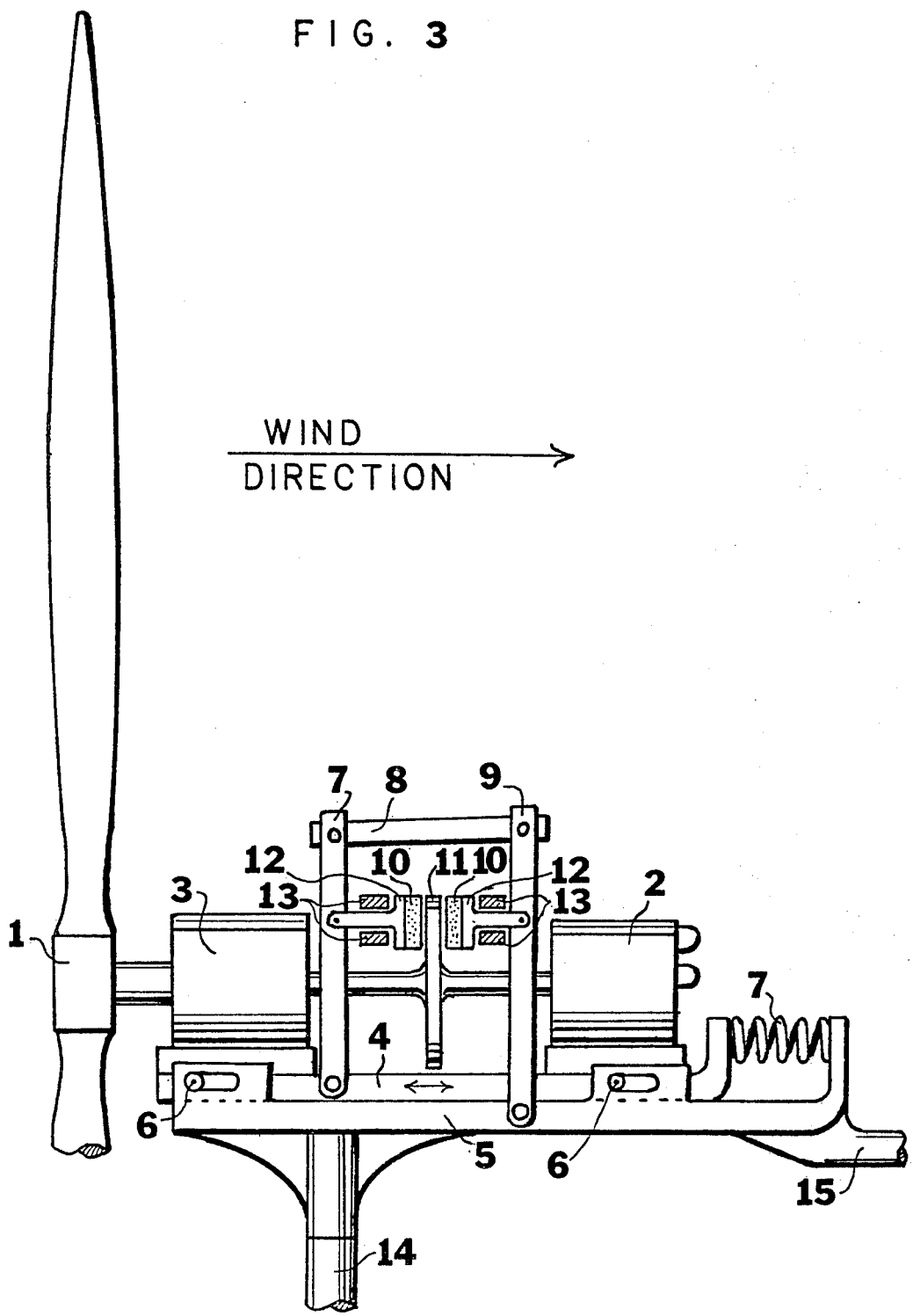
FIG. 3 is a side view of an embodiment of the invention with a spring opposing the rotor thrust and with a lever actuated disc brake.

Referring again to the drawings, FIG. 3 shows an embodiment of the subject invention wherein the rotor 1 drives a load, shown here as a hydraulic pump 2, through a gearbox 3. All of the aforementioned parts are mounted to and move fore and aft with the carriage 4. The carriage 4 is mounted to the base 5 by the rollers 6 moving in slots in the base 5.

The compression spring 7 urges the carriage 4 and the rotor 1 forward into the wind. The spring 7 is sized so that at the wind speed at which regulation is desired the rotor thrust will move the carriage 4 back far enough so that the brake actuation levers 7, 8, and 9 bring the brake pads 10 into contact with the brake disc 11, thus slowing the wind rotor. The brake pad supports 12 are located by the guides 13 which must resist the braking forces on the pads. The guides 13 are rigidly connected to the carriage 4 by supports not shown in the drawing. The entire assembly is supported by the tower 14.

With the upwind rotor configuration shown the left brake actuation lever 7 is connected to the carriage 4 while the right lever 9 is connected to the base 5. For use with a downwind rotor these connections would be reversed and, of course, the tail vane bracket 15 would be unnecessary.

The previous discussion is not meant to imply that only the given combination of wind rotor type, brake type, and brake application means is practical. Those skilled in the art will recognize other embodiments. Known types of mechanical brakes can be interchanged, for example, a drum brake could replace the disc brake and give identical operation. Also, hydraulic and pneumatic systems are known that can replace lever assemblies and give identical results in operation. In addition, magnets or equivalent detent systems can be added.

What is claimed is:

1. A fluid driven turbine system which is self-governing above a predetermined fluid velocity, comprising:
   (a) a turbine rotated by a fluid moving relative to it, said turbine comprising any desired number of blades operatively connected to a hub and said fluid being wind,
   (b) support means for said turbine comprising a carrier on which is mounted both said turbine and an energy conversion device driven by it,
   (c) support means for said carrier allowing a small amount of backward movement for said turbine and carrier, said movement being along the direction of flow of said wind and in response to the thrust forces on said blades produced by operation in said wind, during said movement said support means for said carrier constraining the rotational axis of said turbine to remain substantially parallel to its original position, (d) friction brake means operatively connected to and interposed between said carrier and a shaft rotationally connected to said turbine, (e) resisting means incorporated in said carrier support means to supply a force opposing said backward movement so that the distance of said movement is dependent on the magnitude of said thrust forces and thus on the velocity of said wind, said resisting means comprising a mechanical spring interposed between said carrier and the base of said support means for said carrier, and (f) engagement means effecting application of said brake means when said backward movement exceeds a predetermined value, said brake engagement means comprising a system of links operatively connected to and interposed between said carrier and said carrier support means, said links also being connected to said brake means to actuate said brake means through said backward movement.

* * * * *